United States Patent [19]
Sato

[11] Patent Number: 5,163,163
[45] Date of Patent: Nov. 10, 1992

[54] DIVERSITY RECEPTION CONTROL CIRCUIT

[75] Inventor: Kazuyoshi Sato, Hyogo, Japan

[73] Assignee: Mitsubishi Denki Kabushiki Kaisha, Tokyo, Japan

[21] Appl. No.: 763,273

[22] Filed: Sep. 20, 1991

Related U.S. Application Data

[63] Continuation of Ser. No. 458,522, Dec. 28, 1989.

[30] Foreign Application Priority Data

Aug. 8, 1989 [JP] Japan .................. 1-205253

[51] Int. Cl.⁵ .................. H04B 17/02; H04B 1/16
[52] U.S. Cl. .................. 455/134; 455/226.1; 455/227
[58] Field of Search .............. 455/277, 278, 226, 136, 455/186, 134, 33

[56] References Cited

U.S. PATENT DOCUMENTS 4,619,002 10/1986 Thro .................... 455/226

FOREIGN PATENT DOCUMENTS 0196632 11/1984 Japan .................... 455/277

Primary Examiner—Reinhard J. Eisenzopf
Assistant Examiner—Christine K. Belzer
Attorney, Agent, or Firm—Rothwell, Figg, Ernst & Kurz

[57] ABSTRACT

A diversity control circuit which selects an optimum receiving signal in a diversity receiver and which corrects receiving signal levels in such a manner that characteristics in measuring systems for a plurality of receiving signal levels can be regarded as homogeneous. The circuit includes memory means which stores correction data and which responds to receiving signal levels to provide corrected signals conforming to a preselected characteristic.

2 Claims, 6 Drawing Sheets

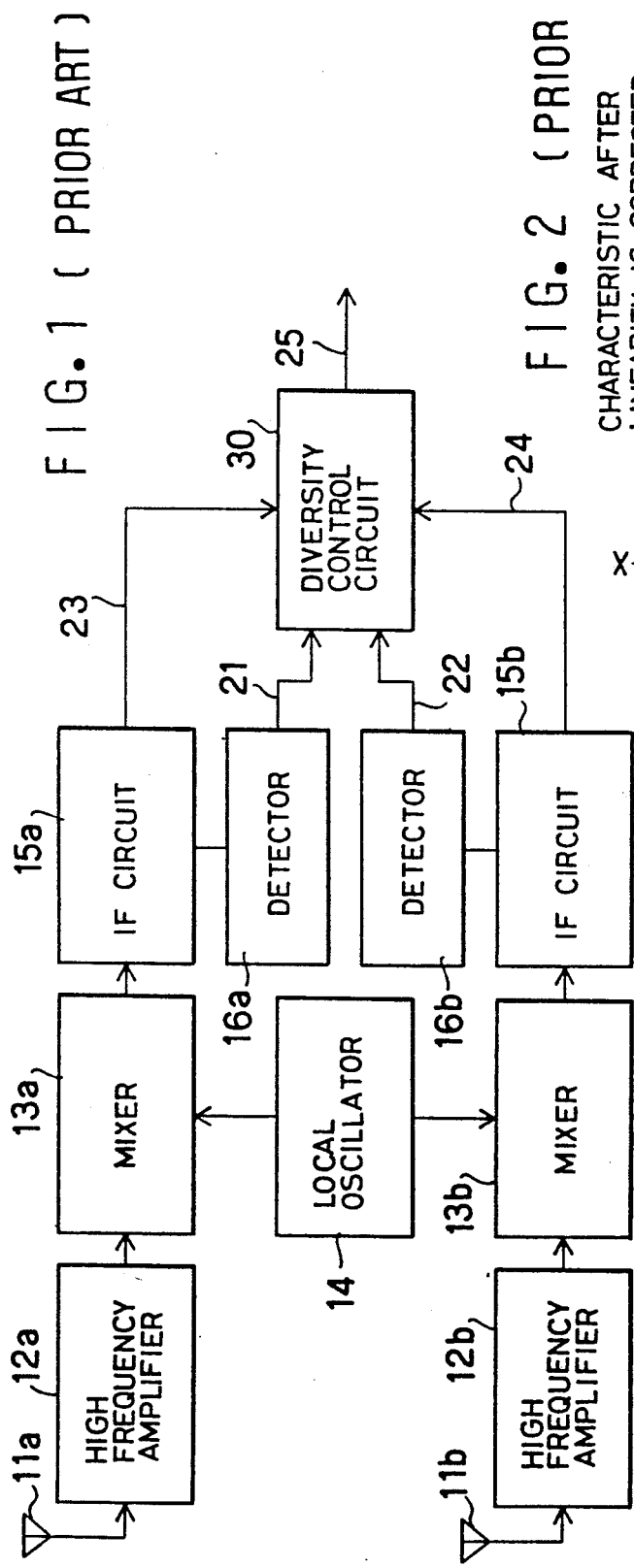
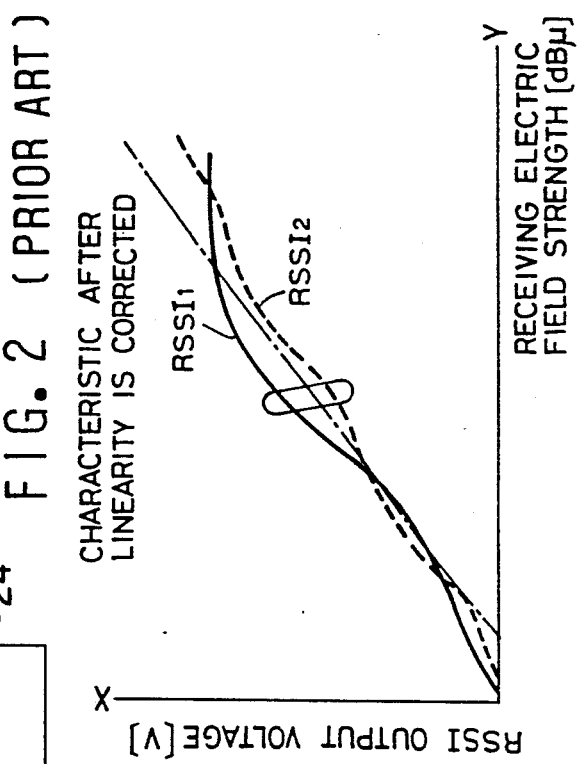

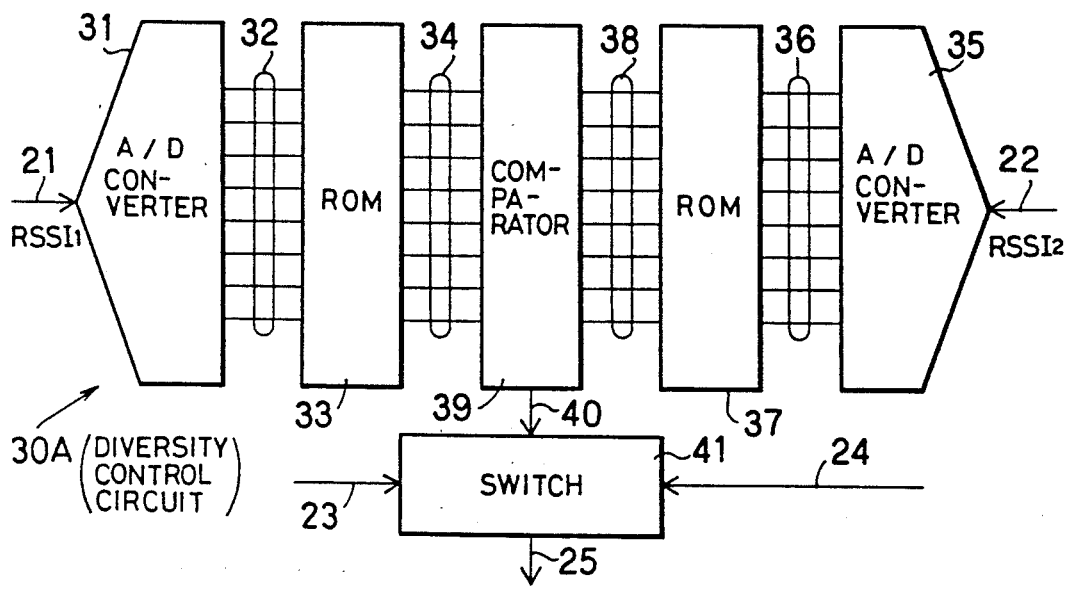
FIG. 5
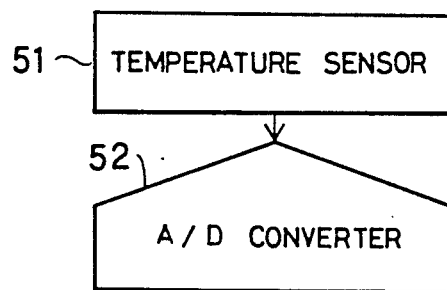
FIG. 6
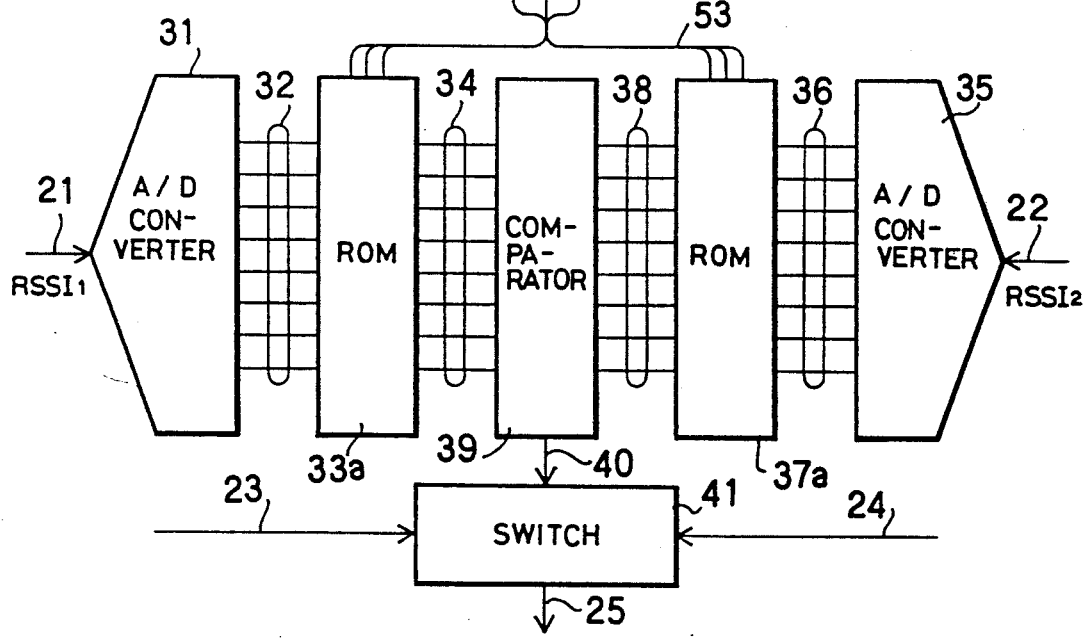

DIVERSITY RECEPTION CONTROL CIRCUIT

This is a continuation of application Ser. No. 07/458,522, Dec. 28, 1989.

BACKGROUND OF THE INVENTION

1. Field of the Invention

This invention relates to a diversity reception control circuit for performing diversity reception control in a radio communication apparatus which performs diversity reception.

2. Description of the Prior Art

FIG. 1 is a block diagram showing a configuration of a diversity receiver which performs diversity reception. In FIG. 1, reference numerals 11a and 11b are antennas which are installed at a distance from each other, 12a and 12b are high frequency amplyifying circuits which extract and amplify a desired band and have a filter function, 13a and 13b are mixers which mix output signals of the high frequency amplifying circuits 12a and 12b and a signal output from a local oscillator 14, respectively, 15a and 15b are intermediate frequency circuits which select a necessary frequency band from an intermediate frequency signal which the mixers 13a and 13b output, and produce demodulation outputs 23 and 24, respectively, 16a and 16b are detection circuits which detect outputs of the intermediate frequency circuits and produce output DC signals 21 and 22, and 30 is a diversity control circuit which selects one of the demodulation outputs 23 and 24 and outputs the selected demodulation output 25. The distance between the antennas 11a and 11b is selected at approximately one-half wavelength of the carrier frequency.

Next, the operation will be described. Radio signals which have been inputted to the antennas 11a and 11b are amplified by the high frequency amplifying circuits 12a and 12b in their desired bands and are inputted to mixers 13a and 13b, respectively. The input signals are converted into intermediate frequency signals by signals from the local oscillator 14. The intermediate frequency signals are inputted into the intermediate frequency circuits 15a and 15b where they are converted into demodulation outputs 23 and 24 of desired channels by selective filters (intermediate frequency filters). One part of the output signals of the intermediate frequency circuits 15a and 15b is subjected to detection such as envelope detection by the detection circuits 16a and 16b, respectively, and converted into the DC signals 21 and 22 proportional respectively to the input signal strengths in each of the receiving systems. Hereinafter, the DC signals 21 and 22 are respectively referred to as RSSI 21 and RSSI 22. (RSSI: Received Signal Strength Indicator). Also, RSSI 21 and RSSI 22 are collectively represented by RSSI 21 and 22. These signals RSSI 21 and 22 vary by undergoing the influences of fading. The levels of the are compared by a comparator which is built into the diversity control circuit 30. The one of the demodulation outputs 23 and 24 which has a higher level is regarded as produced by the antenna located at a spot where the receiving electric field strength is larger, and the higher level one of the demodulation outputs 23 and 24 is selected and outputted from the diversity control circuit 30. It is known that, for an equivalent receiver, sensitivity based on such a diversity reception as described above is improved by 5 to 6 dB in mobile radio communications of a digital system compared with that in the case where diversity is not used. This corresponds to improvement of one to two orders of magnitude in terms of bit-error-rate (BER), which is the error rate in the demodulation of the digitally encoded data. This is illustrated in FIG. 4 and will be explained later in more detail.

Since a conventional diversity control circuit is constituted by a comparator for comparing RSSI levels as described above, the characteristics of each receiving system (antenna, high frequency amplifier, mixer, and intermediate frequency circuit) and those of each of the detection circuits 16a and 16b are desirably indentical in order to provide the same input/output characteristics with respect to each of the RSSI signals 21 and 22 in relation to receiving electric field strength. But, actually, the RSSI signal vs. receiving electric field strength characteristics do not coincide in many cases as shown in FIG. 2. For instance, in region A in FIG. 2 and as shown in enlarged format in FIG. 3, it is possible that the RSSI signals 21 and 22 are generated in inverse proportion to respective actual receiving electric field strengths. Where the values of the RSSI 21 and RSSI 22 are $x_1$ and $x_2$ as shown in FIG. 3, the diversity control circuit 30 selects the demodulation output 23 corresponding to the RSSI 21 because that is the higher level signal, even though the receiving electric field $y_1$ for RSSI 21 is less than that of $y_2$ for RSSI 22. This means that the diversity control circuit 30 has selected the demodulation output 23 corresponding to the weaker receiving electric field strength because $y_1$ is less than $y_2$. Thus, when the RSSIs 21 and 22 are compared by a simple comparator, it is possible to cause selection of the demodulation output of the radio signal for the one of the antennas 11a and 11b which is located at a spot where the receiving electric field strength is actually lower.

Also, since characteristics of the detection circuits 16a and 16b begin to saturate relative to their inputs in regions where the receiving electric field strength is large, the selection between the demodulation outputs 23 and 24 can be further biased toward either signal, such that the advantage of the diversity effect is further lowered, such deterioration being shown by a dotted line in FIG. 4.

SUMMARY OF THE INVENTION

This invention is directed toward elimination of such problems as described above, and, accordingly, an object of this invention is to provide a diversity control circuit capable of consistently and reliably selecting the demodulation output corresponding to the higher receiving electric field strength. This and other objects are accomplished, in one embodiment of this invention, by correcting the characteristics in each measuring system (path from antenna input to RSSI output) in diversity reception.

In such embodiment, the diversity control circuit of this invention is provided with a correction means for making the characteristics of the respective measuring systems coincide with each other, for correcting each RSSI input from the detection circuits using this correction means, and for then comparing each RSSI signal using a comparator.

The correction means of this invention applies such a correction as to make the value of each RSSI signal identical for the identical receiving electric strength, thereby making the characteristics of each measuring system identical.

BRIEF DESCRIPTION OF THE DRAWINGS

FIG. 1 is a block diagram showing a configuration of a diversity receiver;

FIG. 2 is a characteristic diagram showing one example of RSSI vs. Receiving Electric Field Strength characteristics;

FIG. 5 is a block diagram showing a diversity control circuit according to one embodiment of this invention;

FIG. 6 through FIG. 8 are schematic block diagrams showing diversity control circuits according to other embodiments of this invention, respectively;

DETAILED DESCRIPTION OF THE PREFERRED EMBODIMENT

Figure 3:
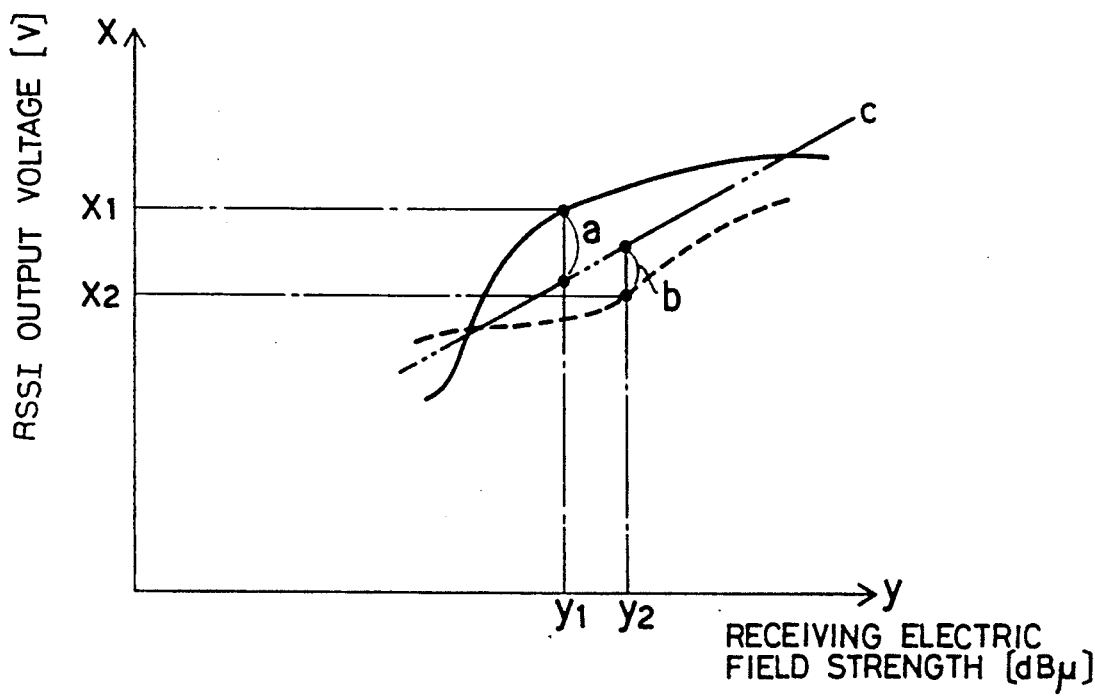
FIG. 3 is an enlarged characteristic diagram shown by enlarging the characteristic diagram shown in FIG. 2.
Figure 4:
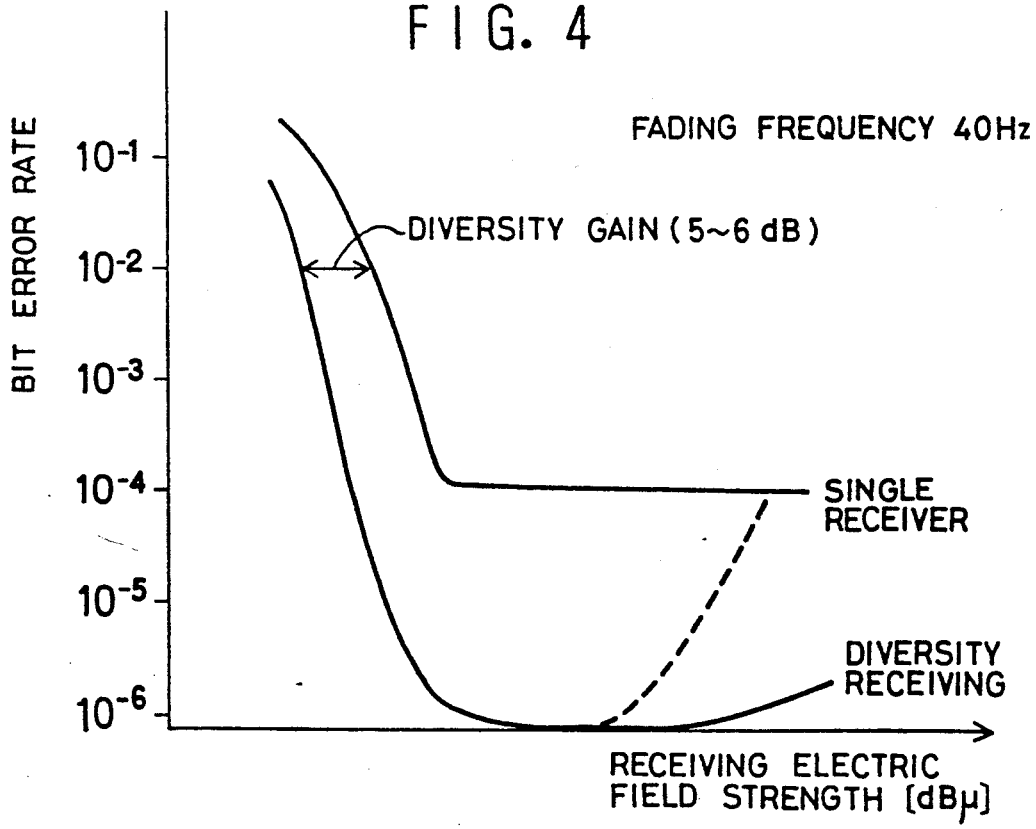
FIG. 4 is a characteristic diagram showing one example of bit-error-rate vs. Receiving Electric Field Strength characteristics.

A preferred embodiment of this invention will now be described with reference to the drawings.

In FIG. 5, reference numeral 31 is an A/D converter which converts the RSSI 21 signal into a digital value 32, 33 a correction ROM which introduces the digital value 32 and outputs a corrected value 34, 35 an A/D converter which converts the RSSI 22 into a digital value 36, 37 a correction ROM which introduces the digital value 36 and outputs a corrected value 38, 39 a comparator which compares the both corrected values 34 and 38, 40 an output signal of the comparator 39, and 41 a switch which selects and outputs either one of the demodulation outputs 23 and 24. The diversity control circuit 30 is composed of the components described above. The whole configuration of the receiver may be identical with or equivalent to that shown in FIG. 1.

In the embodiment of FIG. 5, a diversity control circuit 30A replaces circuit 30 in the arrangement of FIG. 1. Diversity control circuit 30A includes A/D converters 31 and 35 which are connected to receive the RSSI 21 and RSSI 22 signals and convert these respectively into digital signals 32 and 36. Digital signal 32 is connected to the address input of a read only memory ("ROM") 33 and digital signal 36 is connected to the address input of a ROM 37. Stored in ROM's 33 and 37 are correction data which, for each address represented by an RSSI signal digital address input to the ROM, there is provided an output which yields a selected linear response characteristic between the field strength represented by the respective RSSI signals and the outputs 34 and 38 of ROM's 33 and 37.

For example, in the case represented by the characteristics shown in FIG. 3, where the desired linear characteristic is shown by the chain line c, the digital value $x_1$ of the RSSI signal of the unit represented by the solid line is corrected to $(x_1-a)$ to correspond to the value required for a linear response characteristic. Similarly, for the RSSI signal value $x_2$ of the unit represented by the dotted line in FIG. 3, the value is corrected to $(x_2+b)$ to yield a linear characteristic. All of the other values of the RSSI signals at the respective digital levels thereof are similarly corrected by the correction data stored in ROM's 33 and 37 such that the complete response of each unit corresponds to the linear characteristic represented by the chain line c. Thus, for the examples given, for the RSSI signal input of $x_1$ the output of the respective ROM is $(x_1-a)$, and for the RSSI signal input of $x_2$ the output of the respective ROM is $(x_2+b)$. The manner of generating and storing the correction data is described later in further detail.

These ROM output values are compared by a comparator 39, which outputs a signal which selects the demodulation output 23 or 24 corresponding to the larger value. In accordance with this signal, the switch 41 passes the demodulation output 24 therethrough and outputs it at 25. For the example shown in FIG. 3 and described above, demodulation output 24 becomes the final demodulation output 25. In this way, the demodulation output 24 corresponding to the stronger receiving electric field strength is selected.

The number of steps into which the RSSI 21 and 22 signals are divided and stored in ROM's 33 and ROM 37 is selected to yield a resolution adequate for the particular application. Thus, the x axis as represented in FIGS. 2 and 3 is divided into appropriate intervals, and correction data corresponding to respective RSSI values at the divided points are stored in the ROM's. The number of bits of the A/D converters 31 and 35 is determined in accordance with the number of steps. Details on the method storing of data in the ROM's 33 and 37 will be described later.

Since the characteristics of the detection circuits 16a and 16b and the receiving system also vary as a function of boundary temperature, a further correction for temperature variation may also be provided. The block diagram shown in FIG. 6 shows a configuration in which there is provided, in addition to the elements shown in FIG. 5, a temperature sensor 51 for detecting the boundary temperature and outputting a detection value thereof to an A/D converter 52 for converting the detection value into a digital value 53. In this embodiment, the digital value 53 is connected to upper address terminals of ROM's 33a and 37a both having available upper addresses in addition to the addresses which can be specified by the digital values 32 and 36 in the embodiment of FIG. 5. A correction value at each temperature within the range of variations of the boundary temperature is stored in the ROM's 33a and 37a for each step value of the RSSI 21 and 22 signals. Each address is stored in a region which is address-specified with the digital values 32 and 36 used as lower addresses and the digital values 53 used as upper addresses. The digital values 34 and 38 outputted from ROM 33a and ROM 37a thus have linear characteristics corrected for temperature variations. Although correction to a linear characteristic has been shown in each embodiment described above, the corrected characteristic may be a monotonically increasing characteristic and need not necessarily be a straight line.

Figure 7:
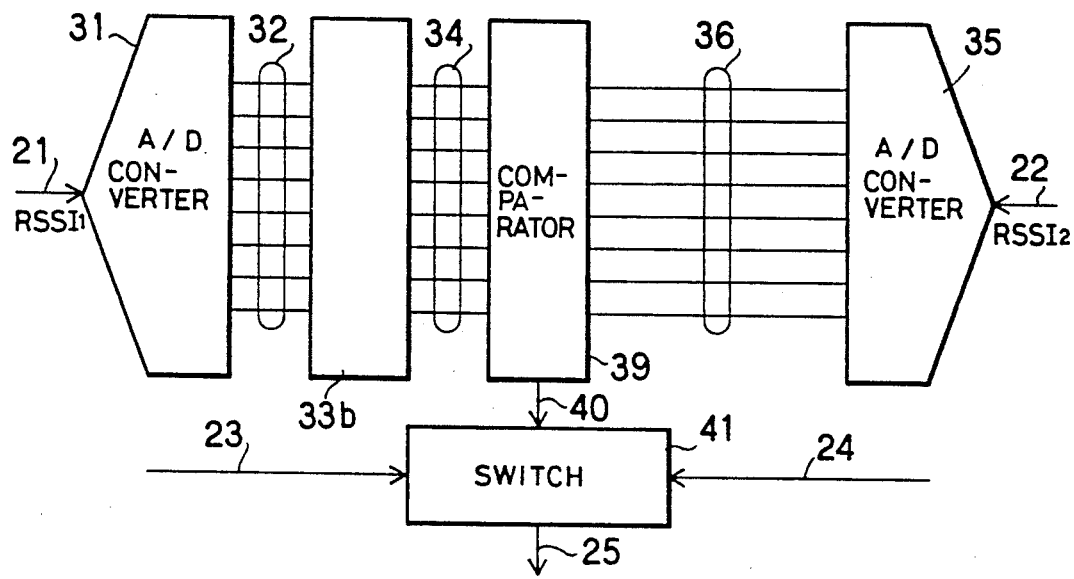
Figure 8:
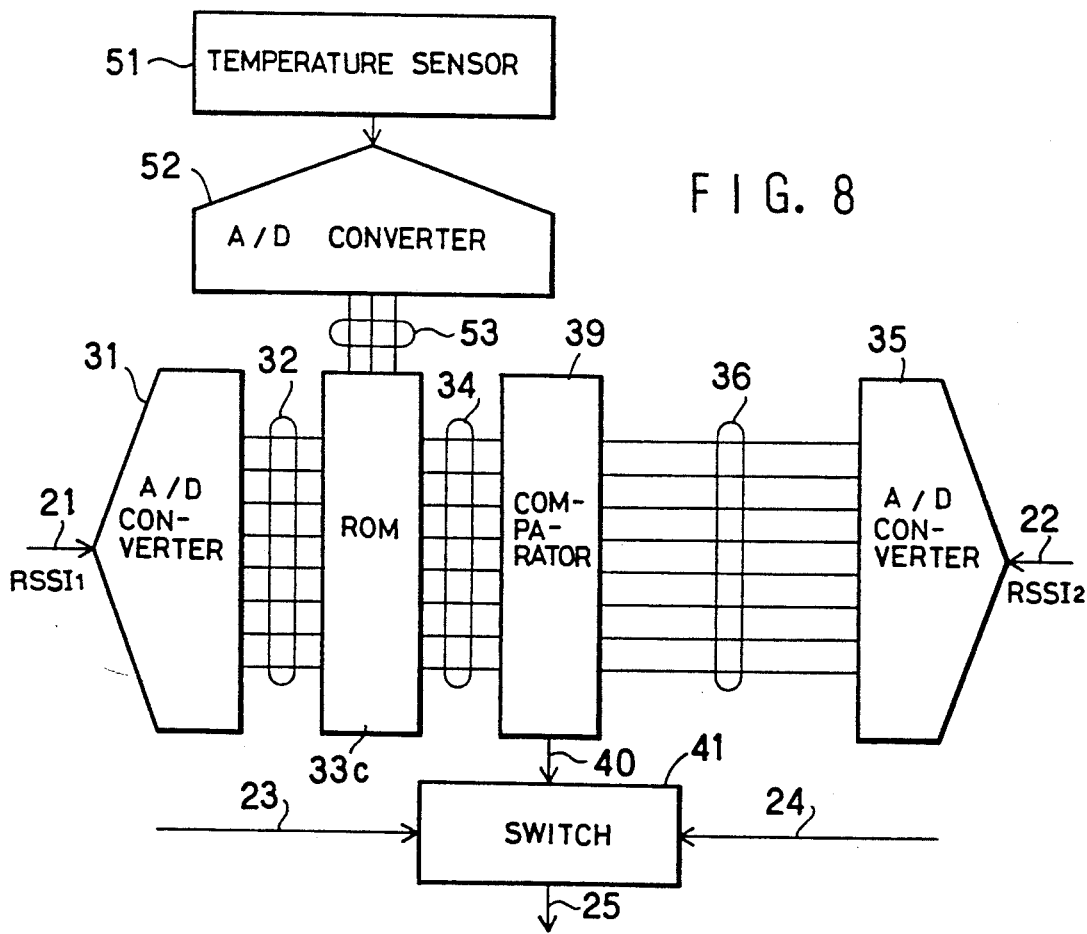

In each embodiment as described above, the two ROM's 33 and 37 or the two ROM's 33a and 37a are corrected into a linear reference characteristic as shown. In the embodiment of FIGS. 7 and 8, ROM 37 and ROM 37a respectively have been removed and a correction is applied to the other system to make its characteristics coincide with that of the RSSI 22 signal system. In the embodiment of FIG. 7, taking the characteristic shown in FIG. 2 by way of example, a value which corrects the characteristic shown by the solid line in FIG. 2 so as to convert it into the characteristic of the other system as shown by the dotted line (instead of correcting it so as to convert it into a linear characteristic shown by the chained line) is stored in a ROM 33b. Thus, the corrected value 34 from the ROM 33b and the digital value 36 of the RSSI 22 signal are based on the same characteristic, and the larger value of them always corresponds to the larger receiving electric field. Accordingly, the same effect as that of the above embodiments is achieved. With such a configuration, the entire arrangement can be further simplified.

Temperature correction can be conducted as well in the case of the configuration in which the ROM 37 or ROM 37a on one side is removed. Such an embodiment is shown in FIG. 8. In the embodiment shown in FIG. 8, a correction value at each temperature within the range of variations of the boundary temperature is stored in a ROM 33c for each step value. Since the RSSI characteristic in a measuring system on the side in which the reference of the RSSI characteristic is formed varies due to temperature, such a correction value as to agree with the characteristic in a measuring system on the side in which the reference of the RSSI characteristic after temperature variations is formed is stored in the ROM 33c. In this way, the digital value 34 output from the ROM 33c and the digital value 36 of the RSSI 22 can be compared under the same characteristic.

Although correction means utilizing digital circuits are shown in the above respective embodiments, those utilizing analog circuits may also be used.

Also, while diversity receivers using two receiving systems have been described in the above embodiments, the present invention is also applicable to receivers provided with three or more receiving systems.

Figure 9:
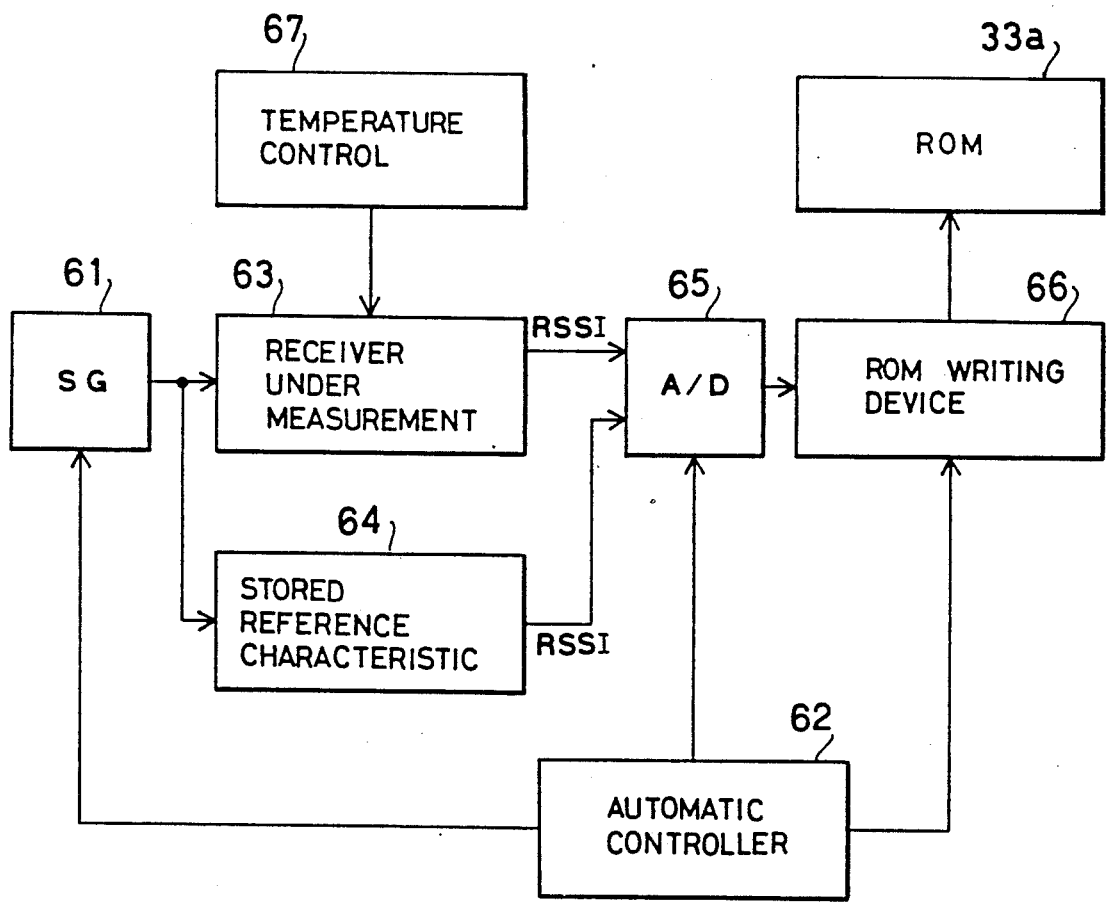
FIG. 9 is a block diagram showing a system for preparing a correction ROM.

FIG. 9 is a block diagram showing the configuration of a system for generating and storing correction data in ROM's 33, 33a, 33b, and 33c and 37 and 37a. In FIG. 9, wherein ROM 33a is used as the example for storage of correction data, reference numeral 61 is a reference signal generator (SG) which generates reference signals representing receiving electric field strength, 62 an automatic controller which controls the output signal level of the SG 61 and the timing for writing in a ROM writing device 66, 63 a receiver under measurement (one system of a diversity receiver), 64 a stored reference characteristic in which the input standard signal has a linear relation to the output RSSI (the RSSI output of which forms the standard for correction), 65 an A/D converter for digitizing the RSSI of the receiver under measurement 63 and the RSSI of the reference characteristic 64, 66 a ROM writing device for storing data in a ROM such as ROM 33a, and 67 a temperature control to control the boundary temperature of the receiver under measurement 64.

The operation of the system of FIG. 9 will now be described. The SG 61 is capable of outputting a simulated receiving electric field strength signal within the rated range of levels to be received by the diversity receivers under measurement. Within this range, the SG 61 provides output levels in a plurality of steps. Assume, for example, that the range of receiving field strength over which correction is to be provided is divided into n levels from 1 to n. The SG 61 provides an output in separately selectable steps where each step is equal to one of the n levels.

Upon start of the operation of the system, automatic controller 62 instructs the SG 61 to output the standard signal of the first step. In response to this standard signal, the RSSI responses of the receiver under measurement 63 and of the stored reference characteristic 64 are delivered to the A/D converter 65 and converted into digital values. The digital values of the two RSSI signals are connected as inputs to the ROM writing device 66 and are inputted to the address terminals and the data terminals of the ROM 33a. Upon direction of the automatic controller 62, the digital value of the RSSI signal from the stored reference characteristic 64 is written into the ROM 33a as data at the address specified by the digital value of the RSSI signal from the receiver under measurement 63. The automatic controller 62 performs the same function for each step sequentially through the nth step.

The same process is followed to store temperature correction data. The boundary temperature of the receiver under measurement 64 is adjusted in steps by the temperature control 67 and the correction data is stored in the ROM 33a through the ROM writing device 66.

In the case where the characteristics of the receiver under measurement are to be matched to those of another receiver, such as in the embodiments of FIGS. 7 and 8, the stored reference characteristic 64 is replaced by the reference receiver against which the characteristics of the receiver under measurement are to be matched and the correction data is stored in ROM's such as 33b and 33c in the embodiments of FIGS. 7 and 8.

It is not necessary that the receiver to be used as a reference receiver have a perfectly linear characteristic. The receiver may be employed if the RSSI signal increases monotonically as a function of the input signal. In such a case, although the corrected values such as at 34 in the embodiments of FIGS. 7 and 8 are not based on a linear characteristic, the RSSI signal will nevertheless increase monotonically as a function of receiving field strength and permit the selection to be accurately made of the receiver which is positioned in the higher field strength location.

Figure 10:
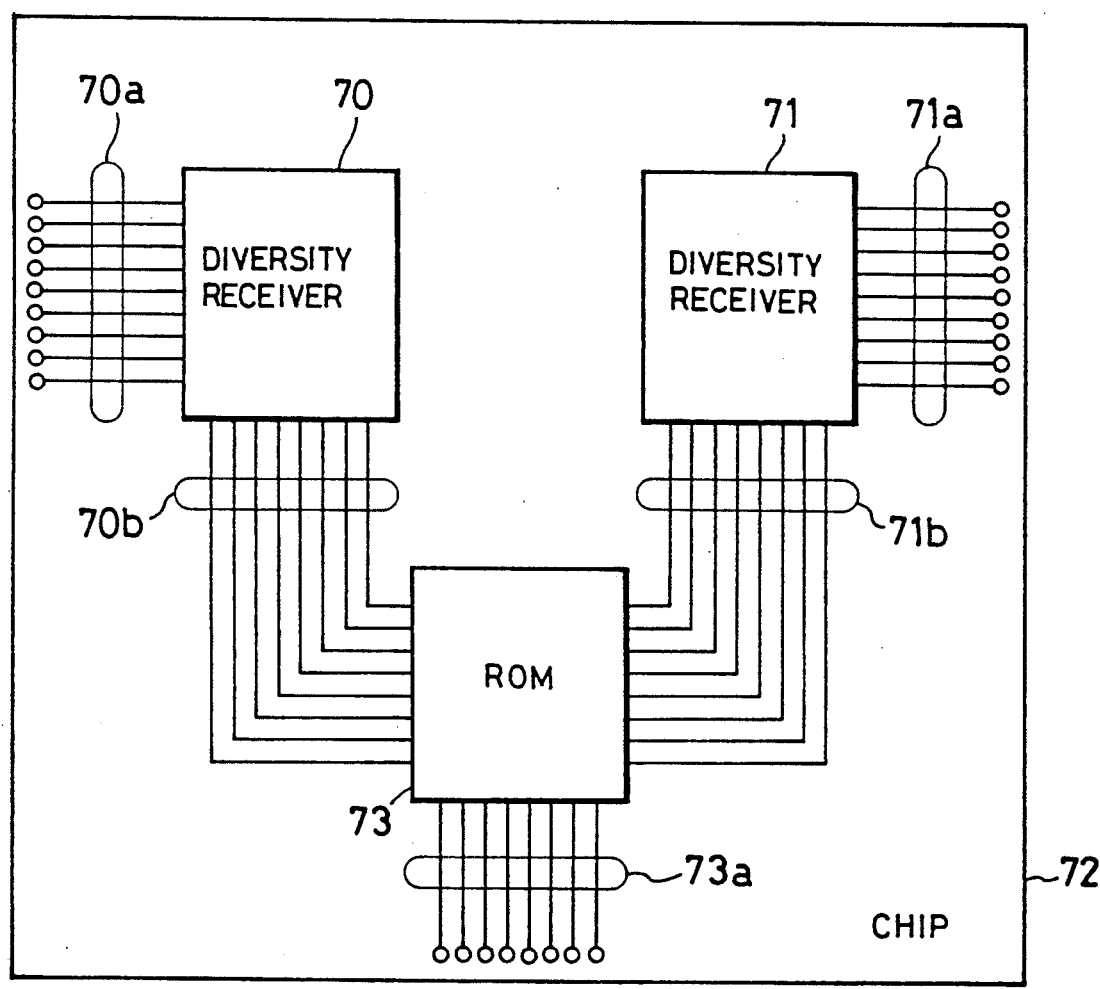
FIG. 10, shows a single integrated circuit chip having integrated thereon two diversity receiver circuits and correction means in accordance with another embodiment of this invention.

In the embodiment of FIG. 10, two diversity receivers 70 and 71 are integrated on a single chip 72 together with a correction ROM 73. Since it is not feasible to illustrate the detailed integrated circuitry of the receivers 70 and 71 and the ROM 73 in the drawing, and since the same are well known to those skilled in the art, only the areas of the chip have been blocked off to show placement of these functions, and the integrated circuit connection lines hereinafter described have been shown schematically as well. The chip 72 may also contain other integrated functions and circuitry in addition to that shown.

The receivers 70 and 71 are connected to suitable external connection pads through integrated connection lines 70a and 71a respectively and to the address and data connections of ROM 73 through integrated connection lines 70b and 71b respectively, as shown. ROM 73 is connected to external connection pads through integrated connection lines 73a. After the chip 72 is formed with the integrated elements and connections as shown in FIG. 10, it is placed in a test fixture where external connections are made to the chip and the correction data is generated and stored in ROM 73 in the manner described above. The result is a single integrated circuit chip having multiple diversity receivers with integrated correction data stored therewith so as to be capable of accurately and reliably operating under and responding to diversity reception control.

Both receivers 70 and 71 are preferably matched to a single standard linear characteristic as in the case of the embodiments of FIGS. 5 and 6. However, the characteristics of either receiver may be matched to those of the other receiver as in the case of the embodiments of FIGS. 7 and 8.

What is claimed is:

1. A diversity control circuit comprising:
    a plurality of antennas positioned at a distance apart from each other so as to be exposed to different receiving electric field strengths of a transmitted signal;
    a plurality of measuring systems each connected to one of said antennas for measuring the receiving electric field strength of each of said antennas and providing measuring signals to permit selection of the antennas positioned in the strongest receiving electric field strength location;
    correction means connected to at least one of said measuring systems for modifying the response characteristic thereof by providing a corrected response whereby the output field strength measuring signal of said at least one measuring system is corrected to conform to a preselected relationship relative to the input thereof for the operating range of input field strength measuring signal levels of said at least one measuring system;
    comparison means for comparing the relative levels of the outputs of said measuring systems; and
    switching means responsive to said comparison means for making electrical connection to the antenna determined by said comparison means to be in the strongest receiving electric field strength location.

2. A diversity control circuit according to claim 1 wherein said measuring systems include receiving systems for demodulating and detecting radio signals received by said antennas to provide said measuring signals.

* * * * *